Feb. 28, 1928.

R. A. CHRISTIAN 1,660,373

CASH REGISTER

Filed March 29, 1926    3 Sheets-Sheet 1

Inventor
Raymond A. Christian
By
His Attorneys

Feb. 28, 1928. 1,660,373
R. A. CHRISTIAN
CASH REGISTER
Filed March 29, 1926 3 Sheets-Sheet 2

Inventor
Raymond A. Christian
By
His Attorneys

Feb. 28, 1928.

R. A. CHRISTIAN 1,660,373

CASH REGISTER

Filed March 29, 1926   3 Sheets-Sheet 3

Inventor
Raymond A. Christian
By Pearl Beust
Henry E Stauffer
His Attorneys

Patented Feb. 28, 1928.

1,660,373

UNITED STATES PATENT OFFICE.

RAYMOND A. CHRISTIAN, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND.

CASH REGISTER.

Application filed March 29, 1926. Serial No. 98,231.

This invention relates to cash registers, and more particularly to total printing control mechanism therefor. It is adapted to be applied to a machine of the general type shown and described in the patents to Fuller, Nos. 1,242,170 and 1,394,256, issued October 9, 1917, and October 18, 1921, respectively, and the patent to Shipley No. 1,602,596, issued October 12, 1926.

The principal object of this invention is the provision of means for preventing printing of group totals by unauthorized persons.

Specifically, an object of this invention is to provide a key for selecting group totalizers in total printing operations which group totalizers are selected automatically by zero stop pawls in adding operations, and a lock for locking the key against depression by any other than an authorized person.

It is a further object to provide a group total key which will actuate detents to remove obstructions to permit the release of the machine in total printing operations, so as to eliminate the necessity of providing means for removing said obstructions as the machine is controlled for total printing operations.

Another object of the invention is to provide mechanism so constructed that any key in each of a plurality of banks may be operated in connection with a totalizing lever to read the total accumulation of items recorded by each key.

With these and incidental objects in view, the invention consists of certain novel features of construction and combinations of parts, the essential elements of which are set forth in appended claims and a preferred form of embodiment of which is hereinafter described with reference to the drawings which accompany and form part of this specification.

General description.

In machines of the type to which this invention is adapted to be applied, there are usually a plurality of banks of amount keys and a plurality of control keys. The control keys are for the purpose of controlling the selection and engagement of the various totalizers corresponding thereto on adding and total printing operations. These machines are normally locked against operation and the usual means for releasing the machine for operation is a motor bar which, upon its depression, releases the machine for operation and also closes the motor circuit as the machine is operated by an electric motor.

The control keys in this invention represent waiters. These keys are free so that each waiter can ascertain the total amount of business entered to his credit. The total amount of business entered in the totalizers corresponding to any bank of waiters' or control keys may be ascertained by the proprietor by depressing the corresponding group total key and operating the machine through a total printing operation. These group total keys are under the control of a lock so that it is impossible for a waiter to operate the machine to print a group total.

*Keyboard.*—The keyboard mechanism in general of the present machine is the same as that shown and described in the before mentioned Fuller patent. It comprises a plurality of banks of the usual amount keys (not shown), three banks of transaction or control keys 30 (Figs. 1 and 7) and a group total key 31 for each bank of control keys, which is for the purpose of controlling the total and sub-total printing of a group of transaction or control keys.

Figure 7:
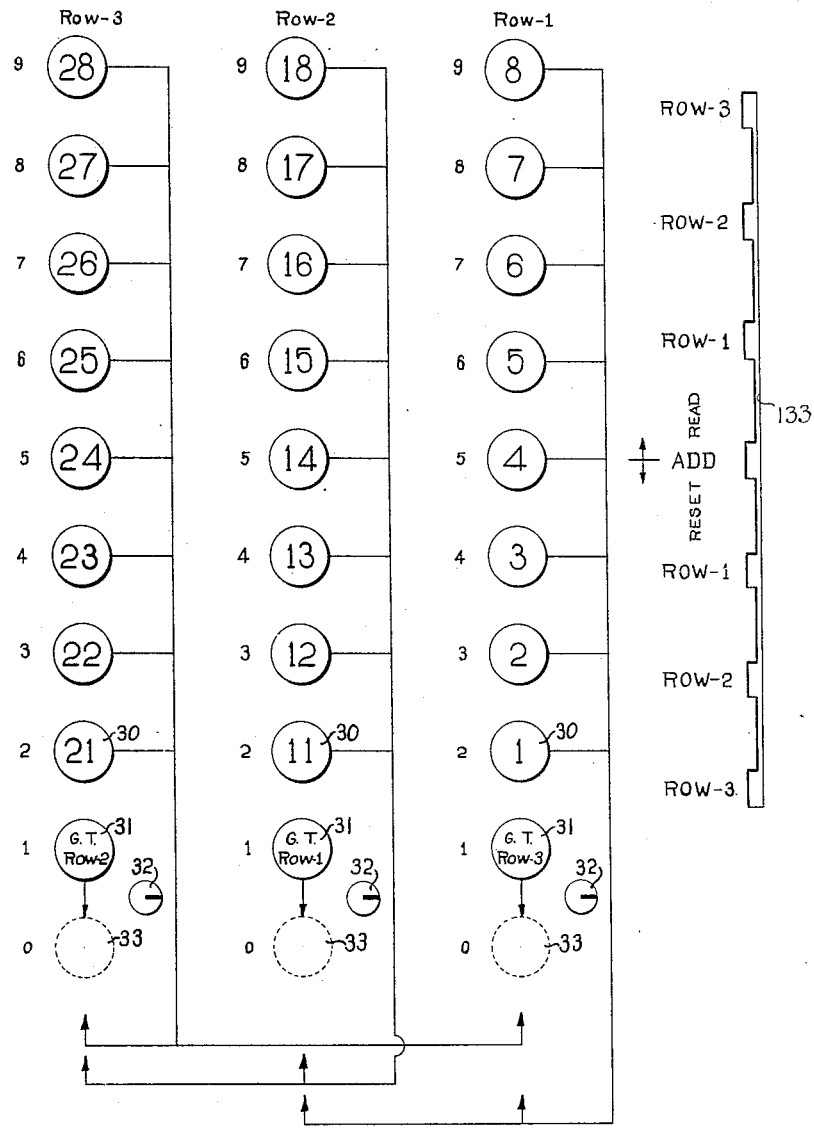
Fig. 7 is a diagram of the transaction or control key banks together with the total printing lever index plate.

The control keys 30 bear numerals which may represent the classification of goods, departments, clerks, and in this particular invention represent waiters. The small numerals placed to the left of the keys as shown in Fig. 7, represent the various positions in which the differential mechanisms are retained by the keys. The dotted circle 33 below each group of keys represents the effective position of the group total key in relation to the differential mechanism hereinafter to be described. A lock 32 is provided for each group total key 31 so that these keys may be locked against operation, thereby placing the printing of the group totals under the control of the proprietor or any other authorized person. The keys 30 and 31 of each control bank are mounted in an individual frame 34 supported on cross rods 35 carried by the machine frame. The keys are retained in their normal outward position by compression springs not shown here.

When a key is depressed, it cooperates with a detent 36 and is thereby retained in its depressed position, as is well known in the art. There is also a second detent 37 which operates a zero stop pawl 38 pivoted to the frame of the bank and adapted to be rocked to ineffective position upon the depression of any of the control keys 30 and the group total key 31 and held in this position until the parts are again restored to normal. The zero stop pawl 38 is caused to swing counter-clockwise against its spring by an arm 39 on a link which supports the lower end of the detent 37.

The present machine is normally released for operation by the depression of a starting key 44, which releases a shaft 45. This shaft is adapted to be rocked in a clockwise direction by means of a spring (not shown). This shaft is prevented from being rocked under the influence of the spring by the engagement of a half-round stud 46, carried by an arm 47 pinned to the shaft 45 with a pair of pawls 48 and 49 loosely mounted on a shaft 50, supported by the machine side frames. It can be seen from Fig. 5, that so long as the pawls 48 and 49 remain in alinement with the flat surface of the half-round stud 46, the shaft 45 cannot be rocked clockwise by its spring to release the machine.

When any one of the control keys 30 or the group total keys 31 in any one of the keybanks is depressed the machine is adapted to be released by the motor bar 44, the shank of which has a bifurcated end 51 adapted to embrace a pair of studs 52 carried by plate 53, which in turn is slidably mounted on a pair of studs 54, supported in the right hand side frame of the machine. The plate 53 also carries a pin 55 which cooperates with a bifurcated end of the lower arm of the lever 56, which is pivoted on a stud in the right hand side frame. At its opposite end the lever carries a pin 57, which projects through the bifurcated end of an arm 58 loose on the shaft 50. The arm 58 is made integral with a hook member 59 by means of a yoke 64. When the motor bar 44 is pressed in, the hook member 59 will be rocked clockwise about the shaft 50.

The inner edge of the hook member 59 engages a pin 65 carried by an arm 66 to rock the arm 66 clockwise as the starting key is depressed. The arm 66 is connected to a bifurcated arm 67 by means of a yoke 68. The bifurcation in the arm 67 embraces a pin 69 carried by the pawl 48, which is the right hand one of the two pawls 48 and 49, as viewed in Fig. 4. This pawl which normally obstructs the movement of the flattened stud 46 and thereby prevents the release of the machine, may be rocked out of effective position to release the machine, by depressing the starting key 44.

Figure 6:
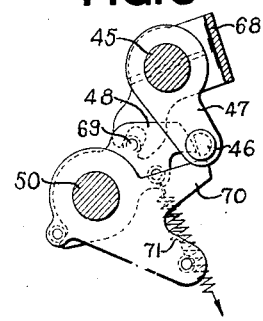
Fig. 6 is a detail view of a portion of the mechanism shown in Fig. 5.

The pawl 49 is under control of the keys in the control banks and will be rocked out of engagement with the stud 46 upon the depression of any one of the said keys in a manner which will be hereinafter described. When the arm 66, yoke 68 and arm 67 are rocked clockwise, it can be seen from Fig. 6 that the pawl 48 will be rocked counter-clockwise about the shaft 50 and will thereby become disengaged from the stud 46. As soon as both the pawls 48 and 49 are raised out of the path of stud 46, this stud, together with the arm 47, and shaft 45 will be rocked clockwise under the influence of the spring (not shown) far enough to permit operation of the machine. The stud 46 will then be positioned between the pawls 48 and 49 on one side and another pawl 70 loose on the shaft 50 and connected to the pawl 48 by a spring 71.

Figure 3:
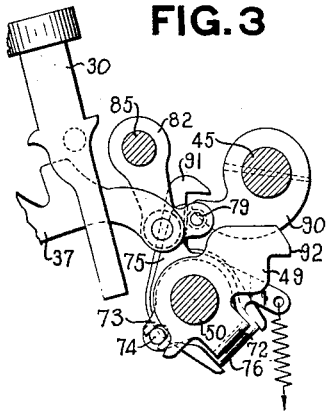
Fig. 3 is a detail view of the transaction or control key release mechanism.

The pawl 49 is connected by a yoke 72 (Figs. 3 and 4) to an arm 73 (Fig. 4) which has a bifurcated portion engaging a pin 74 (Fig. 3) carried by an arm 75. This arm is connected by a yoke 76 to a second arm 77. A third arm 78, which is freely mounted on the shaft 50 at a point intermediate of the arms 75 and 77 is operatively connected to the yoke 76. These three arms are adapted to be engaged by pins 79, 80 and 81 carried by bell cranks 82, 83 and 84, respectively. These bell cranks are freely mounted upon studs 85, supported on the key frames and support the upper ends of the detents 37. Depression of either a key 30 or the group total key 31 of any one of the control banks will cause the pawl 49 to move in a counter-clockwise direction thereby lifting and disengaging it from the half-round pin 46 so that by depressing the motor bar 44, which operates the pawl 48, the machine will be released for operation.

Figure 4:
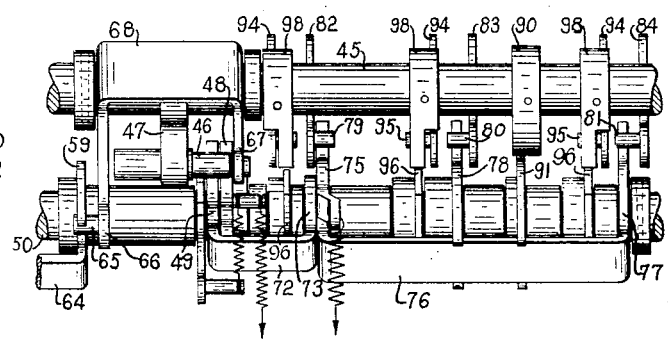
Fig. 4 is a rear elevation of the transaction or control keys and motor bar release mechanism.

In order to prevent the release of the machine until either a control key 30 or a group total key 31 in any one of the three control banks has been depressed a locking means consisting of two members 90 and 91, (Fig. 3) is provided. The member 90 is pinned to the shaft 45 and the member 91 is freely mounted on the shaft 50 and moved on its pivot by the yoke member 76, to which it is operatively connected, as shown in Fig. 4. It may be seen by referring to Figs. 3 and 4 that depression of any one of the keys 30 and 31 will move the locking hook 91 to ineffective position.

Figure 8:
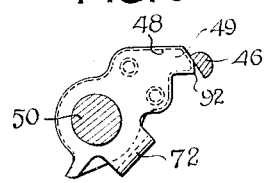
Fig. 8 is a detail view of the release pawls.

For the purpose of compelling depression of the control keys before depression of the motor bar can release the machine, the pawl 49 (Fig. 8) is made slightly longer than the pawl 48, so that the motor bar will not remain depressed unless a control key has been previously depressed. The point of the pawl 49 is truncated as at 92 to permit the pawl to move behind the flattened stud 46 in case the depressed control key is released manually as when the key has been depressed by mistake.

An interlock is provided to prevent release of the machine if any of the control keys or group total keys is only partly depressed or to prevent depression of any of the aforesaid keys if the machine has been released. This mechanism will now be described.

Figure 1:
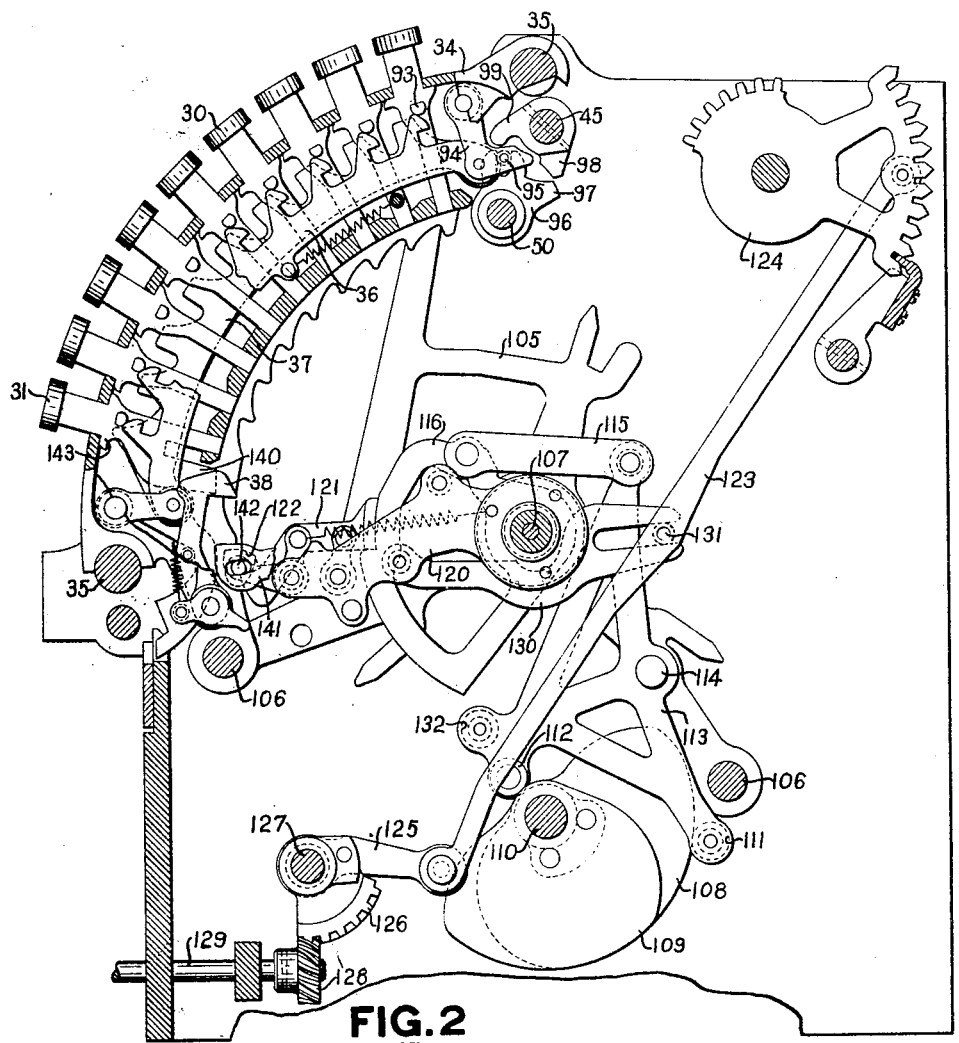
Fig. 1 is a sectional view of the first transaction bank with parts omitted for clearness.

Cooperating with each bank of control keys and group total keys is the detent 36 which has beveled portions cooperating with pins 93 carried by each of the keys. It is evident from Fig. 1 that when a control key is depressed, its pin 93 will move the detent 36 downwardly until the pin passes the beveled portion of said detent whereupon the detent will be returned to its normal position for the purpose of locking the key in its depressed position. The detent 36 is supported at its upper end by an arm 94 which carries a pin 95 projecting through a bifurcated portion of an arm 96 freely mounted on the shaft 50. The arm 96 carries a portion 97, which when a key is partly depressed and the detent 36 is moved downwardly thereby, will be moved into the path of an arm 98 fast on the shaft 45 which is the release shaft. It can therefore be seen that when one of the control keys is depressed only part way, the arm 96 will be rocked counterclockwise by the pin 95 to a position in which the portion 97 will obstruct the arm 98, which will prevent the release of the machine while the parts remain in this position. If the key is fully depressed, however, the detent 36 returns to its normal position as shown in Fig. 1, and the portion 97 of the arm 96 is rocked clockwise out of the path of the arm 98 and therefore there will be no obstruction to the movement of the arm, and the releasing movement of the shaft 45 can take place. There is one of the arms 96, together with its corresponding arm 98, cooperating with each bank of control keys, as shown in Fig. 4.

Figure 5:
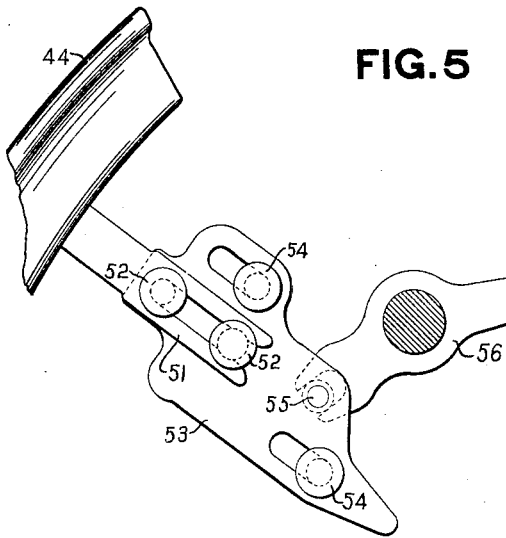
Fig. 5 is a detail side elevation of the motor bar release mechanism.

It is also apparent from Figs. 1 and 5, that when the machine is released, the shaft 45 is rocked clockwise, and arm 98 will also be rocked into the path of the portion 97 of the arm 96, and, therefore it will be impossible to depress any of the control keys or group total keys as the detent 36 will be locked against movement until such time as the shaft 45 is restored to its normal position.

The detent 36 is moved downwardly to release the keys by engagement of an arm 99 with the horizontal portion of the arm 94 upon the restoring movement of the shaft to which arm 99 is secured.

*Differential mechanism.*—The differential mechanisms of the machine are employed to add on the different totalizers and to select them for operation and to set type carriers in the printing mechanism as controlled by the various banks of keys. The differential mechanism for a control bank of keys 30 (Fig. 1) will be briefly described.

There is a differential unit for each of the control banks and just so much of the differential mechanism as is essential in describing the present invention will be described. Each differential unit is supported by a pair of plates 105, one of which is shown, mounted upon rods 106. A rod 107 extends through all the differential units and acts as a stabilizer for the same.

Each differential unit is driven by a pair of cams 108 and 109 fast on a shaft 110. These cams cooperate with rollers 111 and 112, respectively, on a lever 113 pivoted on a stud 114 supported on one of the plates 105.

To the upper end of the lever 113 is pivoted a link 115, which is connected to a driving segment 116 loose on a sleeve fastened on one of the plates 105. Rotation of the cams 108 and 109 causes the segment 116 to move back and forth.

There is an arm 120 on each differential unit, which is caused to move clockwise with the segment 116 by a latch member 121 supported thereon by a link and by a bell crank arm 122, which is adapted to engage with a depressed key and break the connection between the segment 116 and the arm 120 so that the arm 120 moves differentially according to the key depressed. Each differential is connected by a link 123 to a segment 124 which operates a carriage supporting indicator plates, all of which is fully described in the Fuller Patent, No. 1,163,748, dated December 14, 1915.

The lower end of the link 123 is connected to an arm 125 which is secured to a segment gear 126 pivoted on a rod 127 and in mesh with a pinion 128 fast on a shaft 129 which is operatively connected to a type bearing member used in printing the transaction on the record material. The link is positioned under control of the differential mechanism by an arm 130 pivoted on the differential arm 120 and bifurcated at its right hand end to engage a stud 131 carried by the link 123. The middle portion of the arm is driven to the position shown in Fig. 1 by a roller 132 on the arm 113 in the usual manner.

The machine is equipped with three groups of totalizers but they are not shown or described here as they are of the regular type and are fully illustrated and described in the Fuller patents previously referred to.

Referring to Fig. 7, this figure shows a diagram of the control keys together with the group total keys and index plate for the total lever. The group total key which controls the reading of the total accumulation of items for the keys in row 1, is placed in the lower, or one, position in the second or middle row of control keys. The reason for this is that the totalizers for each individual key in the first row are arranged in one totalizer line and the group totalizer for this same group of control keys occupies a position on the totalizer line with the totalizers for the second or middle row of control keys. This same condition prevails with each of the rows of control keys.

The group totalizer wheels occupy the zero positions on their respective lines so that their selection is automatically made in adding operations by the zero stop pawls when no key is depressed in the bank of keys corresponding to the line in which they occur. Thus a depressed key in any one of the banks selects its corresponding totalizer and the zero stop pawls automatically select the group totalizers in the other rows. The group totalizer corresponding to the row in which the depressed key occurs is engaged with the differential actuators while the other group totalizer remains out of engagement. This control over the totalizer engaging means is shown and described in a co-pending application of B. M. Shipley, Serial No. 610,273, filed January 2, 1923, and therefore no further reference will be made thereto.

The group totalizers are selected in total printing operations by means of the group total keys 31, the engagement of the totalizers being controlled by a total control lever (not shown) operating in the slot 133 shown in Fig. 7.

Figure 2:
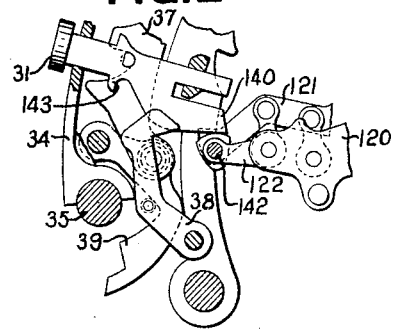
Fig. 2 is a detail view of the first group total key in depressed position with the differential latch broken in zero position.

As the group total keys are in the "one" position in their respective banks, it is necessary to have a specially formed key to break the latch of the differential mechanism in the zero position just as would happen in the regular construction when no key is depressed in a bank. In the regular construction, when no key is depressed in a bank, the differential latch is broken in the zero position by the zero stop pawl 38. In the present invention the group total key 31, when depressed, will operate the zero stop pawl through the detent 37 so that it will be moved into its ineffective position and the differential latch will be broken by an extension 140 on the key 31 (Fig. 2). This extension assumes the same relation to the differential latch that the zero stop pawl 38 does in its normal position. While the zero stop pawl 38 is not in direct alinement with the latch member 122, it is in alinement with an arm 141 part of which is shown in Fig. 1, which is operatively connected to the latch member 122 by a pin 142.

With this construction the operator or waiter, with the system in mind in this invention, is permitted to read the total amount of items registered by himself at any time by placing the total lever in one of the read positions corresponding to the row in which his key is located according to the index shown in Fig. 7, and by depressing his key and operating the machine, the latter will print the total accumulation on the selected totalizer. The group total keys 31 are normally locked against operation by the locks 32, which may be of a flat bolt type so that when they are in an effective position the bolt assumes a position under the lug 143 (Fig. 1) of the keys 31.

By placing the total lever in the upper row 2 position and unlocking and depressing the group total key for row 1, the operation of the machine will print the grand total of the accumulation of all items entered by the keys in row 1. The same results are obtained from the other two rows of control or waiters' keys by placing the total lever in a position corresponding to the row of keys in which the desired group total key is located, and depressing the respective group total key. When a group total is to be taken and the totalizer is to be reset to zero, the total lever is moved downwardly to its proper position as shown by the diagram in Fig. 7, and the proper group total key is depressed as before.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, the combination of a plurality of banks of depressible totalizer selecting keys, one of said keys in each bank selecting a totalizer on which are accumulated the totals of totalizers selected by a plurality of keys in another bank, and means for automatically selecting, in adding operations, the totalizer selected by said one key.

2. In a machine of the class described, the combination of a plurality of manipulative means, a differential mechanism adapted to be controlled by said manipulative means, means for stopping said differential mechanism in zero position when said manipulative means is not operated, means for disabling said stopping means upon depression of said manipulative means, and means positioned by one of said manipulative means for stopping said differential mechanism in zero position.

3. In a machine of the class described, the combination of a bank of depressible keys, a differential mechanism adapted to be controlled by said keys, means for actuating said differential mechanism, means for breaking the latch of said differential mechanism in the zero position when none of said keys is depressed, and a special depressible key adapted to cause said latch to break in the zero position.

4. In a machine of the class described, the combination of a plurality of banks of keys each bank including a key in the zero position, a zero stop pawl for each bank movable into non-functioning position by any key in its respective bank, a release shaft, means normally obstructing releasing movement of said shaft, and means operable from any key in any one of said banks for removing said obstructing means to permit releasing movement of said shaft.

In testimony whereof I affix my signature.

RAYMOND A. CHRISTIAN.